(12) United States Patent
Huber

(10) Patent No.: US 12,449,138 B2
(45) Date of Patent: Oct. 21, 2025

(54) COOKING APPLIANCE HAVING A PEF GENERATOR, PEF SYSTEM AND METHOD

(71) Applicant: BSH Hausgeräte GmbH, Munich (DE)

(72) Inventor: Andreas Huber, Traunreut (DE)

(73) Assignee: BSH Hausgeräte GmbH, Munich (DE)

( * ) Notice: Subject to any disclaimer, the term of this patent is extended or adjusted under 35 U.S.C. 154(b) by 914 days.

(21) Appl. No.: 17/628,236

(22) PCT Filed: Aug. 5, 2020

(86) PCT No.: PCT/EP2020/071989
§ 371 (c)(1),
(2) Date: Jan. 19, 2022

(87) PCT Pub. No.: WO2021/032479
PCT Pub. Date: Feb. 25, 2021

(65) Prior Publication Data
US 2022/0357048 A1    Nov. 10, 2022

(30) Foreign Application Priority Data

Aug. 21, 2019 (DE) .................. 10 2019 212 485.2

(51) Int. Cl.
*F24C 15/10* (2006.01)
*H05B 6/12* (2006.01)
*H05B 6/62* (2006.01)

(52) U.S. Cl.
CPC ......... *F24C 15/102* (2013.01); *H05B 6/1209* (2013.01); *H05B 6/62* (2013.01)

(58) Field of Classification Search
CPC .......... H05B 6/62; H05B 3/0004; H05B 6/54; H05B 1/0261; H05B 2213/05; H05B 3/0014; H05B 6/062; H05B 6/065; H05B 6/105; H05B 6/12; H05B 6/1209; H05B 6/1263; H05B 6/1272; H05B 6/645;
(Continued)

(56) References Cited

U.S. PATENT DOCUMENTS 3,632,962 A * 1/1972 Cherniak ............. A47J 37/0611
                                                        392/338
4,431,892 A * 2/1984 White .................. F24C 15/101
                                                        126/299 D
(Continued)

FOREIGN PATENT DOCUMENTS

DE    102010028780 A1    11/2011
DE    102014201422 A1     7/2015
(Continued)

OTHER PUBLICATIONS

International Search Report PCT/EP2020/071989 dated Oct. 9, 2020.

*Primary Examiner* — Chris Q Liu
(74) *Attorney, Agent, or Firm* — Michael E. Tschupp; Brandon G. Braun; Andre Pallapies

(57) ABSTRACT

A cooking appliance includes a cooktop including an energy transmission unit for transmitting energy in order to heat a place-on appliance placed on the cooktop, and a PEF ("Pulsed Electric Fields") cooking apparatus including a receptacle accessible from a top side of the cooktop and designed for insertion of a PEF container. The receptacle includes a connection contact for electrically connecting to the PEF container inserted in the receptacle.

15 Claims, 3 Drawing Sheets

(58) Field of Classification Search
CPC .... H05B 6/725; F24C 15/2042; F24C 15/003; F24C 15/101; F24C 15/14; F24C 15/166; F24C 15/18; F24C 15/30; F24C 15/327
USPC ......... 99/358, 330, 339, 340, 400, 425, 446, 99/451, 476, 483; 219/401, 200, 400, 219/428, 450.1, 452.11, 452.12, 452.13, 219/621, 623, 626, 671
See application file for complete search history.

(56) References Cited

U.S. PATENT DOCUMENTS

| | | | | |
|---|---|---|---|---|
| 5,549,041 | A * | 8/1996 | Zhang | H05B 6/62 99/451 |
| 5,713,265 | A * | 2/1998 | Strader | F24C 15/14 126/41 R |
| 6,399,925 | B1 * | 6/2002 | Pickering | A47J 37/0623 126/211 |
| 7,227,106 | B2 * | 6/2007 | Sung | F24C 15/30 219/452.11 |
| 7,323,662 | B2 * | 1/2008 | Cho | F24C 15/327 219/400 |
| 2008/0163758 | A1 * | 7/2008 | Jeong | G01F 23/265 122/494 |
| 2010/0230397 | A1 * | 9/2010 | Ohashi | A21B 3/04 219/401 |
| 2013/0264333 | A1 * | 10/2013 | Alipour | A47J 36/321 219/621 |
| 2014/0057025 | A1 | 2/2014 | Van Oord | |
| 2016/0150905 | A1 | 6/2016 | Van Oord | |
| 2016/0205972 | A1 | 7/2016 | Van Oord | |
| 2019/0082877 | A1 * | 3/2019 | Dumenil | A47J 27/004 |
| 2019/0261467 | A1 * | 8/2019 | Hoffmann | H05B 6/065 |

FOREIGN PATENT DOCUMENTS

| | | |
|---|---|---|
| EP | 3503678 A1 | 6/2019 |
| WO | 2011139144 A1 | 11/2011 |

* cited by examiner

COOKING APPLIANCE HAVING A PEF GENERATOR, PEF SYSTEM AND METHOD

CROSS-REFERENCES TO RELATED APPLICATIONS

This application is the U.S. National Stage of International Application No. PCT/EP2020/071989, filed Aug. 5, 2020, which designated the United States and has been published as International Publication No. WO 2021/032479 A1 and which claims the priority of German Patent Application, Serial No. 10 2019 212 485.2, filed Aug. 21, 2019, pursuant to 35 U.S.C. 119 (a)-(d).

The contents of International Application No. PCT/EP2020/071989 and German Patent Application, Serial No. 10 2019 212 485.2 are incorporated herein by reference in their entireties as if fully set forth herein.

BACKGROUND OF THE INVENTION

The invention relates to a cooking appliance having a PEF generator and a receptacle for at least one PEF container. The invention further relates to a system comprising the cooking appliance and at least one PEF container which is inserted into the receptacle. The invention further relates to a method for the PEF treatment of food to be cooked. The invention is, in particular, advantageously applicable to cooking appliances which have a cooktop.

A method for supplying energy into food which has been hitherto used commercially in the food industry is based on the generation of pulsed electric DC fields ("Pulsed Electric Fields"; PEF) at the site of the food. In this case, food is subjected to alternating electric fields with a pulse duration of, for example, up to several tens of microseconds. These alternating fields bring about alternating current surges flowing through the food, which introduce an ohmic power loss into the food and thereby bring about an ohmic heating of the food. Moreover, capacitive displacement currents, which may assume very high values, are generated in the food. These displacement currents bring about a certain degree of sterilization of the food and in terms of their effect on the food are reminiscent of the process of pasteurization.

In the case of non-liquid or, respectively, lumpy food, the intermediate spaces therebetween are filled with water. In this case, so much salt is added to the water that the electrical conductivity of the water at least approximately corresponds to the electrical conductivity of the food.

WO 2011/139144 A1 discloses a method and a system for treating a substantially solid foodstuffs product, in which a cell disruption of the foodstuffs product occurs and the required temperature rise which is necessary for processing macronutrients is created. The system comprises means which are arranged in order to subject the food product to a pulsed electric field to break down the cells of the food product and to process the macronutrients, whereby the food product is prepared for the intended consumption and for efficient digestion.

DE 10 2010 028 780 A1 provides a device and a method for heating food in batches, in particular meat and sausage products, which may optionally be arranged in an electrically conductive sleeve in a chamber which has two spaced-apart electrodes which may be subjected to electrical voltage, wherein the electrical voltage is AC voltage at a frequency of 500 Hz to 10 MHz or pulse voltage consisting of bipolar pulses without a DC component, having pulse widths or, respectively, pulse durations of 50 ns to 1 ms.

WO 2015/005793 A1 discloses a method for cooking a food product in batches in a treatment chamber, wherein the treatment chamber has two opposing side walls which in each case form an electrode, wherein each electrode is at an angle of at most 45° relative to the vertical plane, wherein the method comprises the following steps: (1) introducing a quantity of the food product into the treatment chamber between the two electrodes, optionally into a surrounding liquid, so that the food product and/or the surrounding liquid are in direct contact with the electrodes; and (2) applying electrical pulses, which are generated by a generator for pulsed electric fields, to the electrodes so that the food product is subjected to a pulsed electric field having a field strength ranging from 10 V/cm to 10 kV/cm, wherein the number of pulses ranges from 1 to 2,000,000 and the pulses in each case have a duration ranging from 1 to 20,000 µs, wherein the food product and, if present, the surrounding liquid have an electrical conductivity ranging from 0.01 to 10 S/m.

BRIEF SUMMARY OF THE INVENTION

It is the object of the present invention to provide a user with a particularly user-friendly option for using a PEF appliance for preparing food to be cooked.

This object is achieved according to the features of the independent claims. Advantageous embodiments form the subject matter of the dependent claims, the description and the drawings.

The object is achieved by a cooking appliance comprising a cooktop having at least one energy transmission unit for transmitting energy to a place-on appliance placed on the cooktop and having at least one PEF cooking apparatus, wherein the at least one PEF cooking apparatus comprises:
- at least one PEF generator and
- at least one receptacle, which is accessible from a top side of the cooktop and is designed for the insertion of at least one PEF container, wherein each receptacle comprises at least one connection contact which is connected to the PEF generator for electrically connecting to at least one PEF container inserted in said receptacle.

The cooking appliance thus comprises a cooktop with a PEF cooking apparatus integrated therein. The present cooking appliance makes use of the knowledge that food to be cooked is heated in water by means of the PEF method and may be cooked thereby. Thus browning of the food to be cooked or other type of treatment is not able to be achieved by means of the PEF method. By the integration of the PEF cooking apparatus in the cooktop the possibility is now provided of further treatment of food to be cooked which has been previously PEF-cooked, by other methods provided by the cooktop or, respectively, the place-on appliances which may be used thereon. Thus a desired browning of food to be cooked which was previously PEF-cooked may be achieved by searing, by means of a place-on appliance such as an item of cookware (for example a pan or pot) or a grill plate by the conventional means of a cooktop. Since the working steps of cooking and browning are carried out in the immediate vicinity of one another, this results in short distances for a user which in turn increases user satisfaction. This also contributes to the fact that for performing the PEF method the PEF containers are handled in the region of the hotplate, in particular adjacent to cooking zones defined by the energy transmission unit(s). The object may also be quite generally achieved by a cooktop in which a PEF cooking apparatus is integrated.

It is a development that the cooking appliance is a household appliance. It may be a built-in appliance. The cooking appliance may have or may be a separate cooktop or may be present as an oven/cooktop combination ("cooker"). The cooktop may have a glass ceramic plate on the top side.

The at least one energy transmission unit is provided or designed (i.e. designed and arranged) to transmit energy to a place-on appliance placed on the cooktop. The at least one energy transmission unit may have, for example:
- at least one radiant heating element, for example an electrical resistance heating conductor ("radiant cooktop"), which emits energy in the form of heat radiation;
- at least one coil for generating eddy currents in the place-on appliance ("induction cooktop");
- at least one coil for transformer coupling to an electrically operatable place-on appliance ("transformation cooktop").

The place-on appliance may be any accessory which may be operated by placing on the cooktop and by means of the cooktop, for example an item of cookware (for example a pot, a pan, a roasting dish, etc.), a grill plate, etc.

The PEF cooking apparatus serves to cook food to be cooked by means of the PEF method. The PEF method is known in principle and thus is not described further here.

The food to be cooked may encompass, in particular, food. Food in this case encompasses in principle all types of animal or vegetable food, in particular all types of fruit, vegetables, meat, fish or poultry, and namely irrespective of whether the food is present raw or pre-prepared at the start of the preparation. Further food such as egg dishes, cereals, rice, pasta, etc. may also be prepared by means of the PEF cooking apparatus.

The PEF generator generates pulsed electrical signals ("PEF signals") which may be applied to the at least one connection contact of the receptacle. The at least one connection contact which is connected to the PEF generator is, in particular, connected to a signal output of the PEF generator. If the PEF generator has a plurality of signal outputs, in a development these signal outputs may be controlled individually. A signal output may be connected to one or more connection contacts.

It is a development that the PEF generator has control and power electronics. In this case, the control electronics and the power electronics may be arranged separately or integrated in an electronics unit. The control electronics and/or the power electronics may be assigned one or more fans for the cooling thereof.

It is a development that the receptacle has a top-side opening for inserting at least one PEF container. This opening is formed, in particular, by a cutout in the cooktop plate, for example the glass ceramic plate. The receptacle is located, therefore, in particular, adjacent to the at least one cooking zone defined by the at least one energy transmission unit, for example centrally thereto in the case of four cooking zones.

A receptacle may be designed or provided for inserting or accommodating one or more PEF containers. A cooking appliance may have one or more receptacles.

It is an embodiment that at least one connection contact is connected to the PEF generator. This advantageously permits an operation of at least one PEF electrode of an inserted PEF container with a PEF signal, as is described in more detail below.

It is an embodiment that a plurality of connection contacts are connected to the PEF generator. Thus the further or other connection contact may also be connected to the PEF generator. To this end, in particular, at least two connection contacts are connected to different signal outputs of the PEF generator. By means of this embodiment the advantage is achieved that the PEF container may also be operated without earthing. In particular in the case of operation with opposing polarity or in opposing directions, a further advantage is that lower voltage levels need to be generated than in the earthed variant: if for example in the earthed variant a PEF signal or a PEF pulse is generated with an amplitude of 1000 V, in the variant operated with PEF signals in opposing directions, in order to generate the same effect only two PEF signals need to be generated at +500 V and −500 V and applied to different connection contacts, which may reduce the technical complexity of the appliance.

It is an embodiment that at least one, specifically each, receptacle has at least one further contact which is grounded or, respectively, at a reference potential for electrically connecting at least one PEF container inserted therein. In particular, therefore, each receptacle may have at least two connection contacts for electrically connecting at least one PEF container inserted therein, at least one connection contact thereof being connected to a signal output of the PEF generator and at least one further connection contact thereof being connected to ground. In particular, each receptacle may have in each case two connection contacts for receiving a PEF container. The connection contacts may be integrated in a common contact unit, for example in a connecting plug. Alternatively, the connection contacts may be arranged separately.

Generally, the connection contacts of the receptacle serve to be electrically connected to corresponding mating contacts of a PEF container inserted into the receptacle, wherein the mating contacts in turn are electrically connected in each case to one or more PEF electrodes. In the case of an inserted PEF container, therefore, at least one PEF electrode is connected to a signal output of the PEF generator via a contact pair consisting of a connection contact and mating contact. At least one further PEF electrode is connected to ground or to the PEF generator, via a further contact pair consisting of a connection contact and mating contact.

It is an embodiment that the receptacle is connected via a drain to a receiving container or collection container. This results in the advantage that liquid overflowing from the PEF container, condensate formed in the receptacle, etc. is able to drain out of the receptacle. In a development, the collection container may be removable for cleaning and/or emptying. It is a development that the collection container is arranged below or on a bottom side of the cooktop. As a result, no space is required for the collection container in the vicinity of the top side, the receiving container may be configured to be of large volume/high and it may be removed in a particularly simple manner. It is a development that the drain opens at its upper end into a base of the receptacle, in particular in the deepest region thereof, in particular in the case of a slightly inclined (for example funnel-shaped) path of the base.

It is a development that the receptacle is connected via a drain to an outflow or, respectively, is connected to an outflow. Thus the advantage is achieved that the liquid overflowing from the PEF container and the condensate formed in the receptacle passes directly into a drain and no longer needs to be disposed of by a user.

It is an embodiment that the cooking appliance has at least one cover for covering at least one receptacle on the top side.

The at least one cover serves for operational safety, for example in order to prevent touching the connection contacts and/or PEF electrodes during the operation of the PEF generator. In particular, it is possible for each receptacle to be able to be covered by means of exactly one cover. The cover may be pivotably fastened to the cooking appliance relative to the hotplate. The cover, in particular, may be openable, in particular at least on the appliance side or automatically. The cover may be closable on the appliance side and/or manually. The cover may be regarded as a part or component of the receptacle.

It is an embodiment that the cooking appliance is designed to detect a closed state of the cover or, respectively, the shut state thereof and to activate the associated at least one PEF generator only when the cover is closed. Thus a particularly high level of operational safety is achieved. The activation of the PEF generator may comprise supplying the PEF generator with electrical power. To this end, the cooking appliance may have a monitoring apparatus which detects whether the cover is closed. The monitoring apparatus may comprise, for example, at least one electrical contact, a mechanically actuatable contact or microswitch, a light barrier, etc. Specifically the use of a mechanically actuatable contact switch permits a reliable, compact and cost-effective implementation.

It is a development that a PEF electrode is integrated in the cover. This PEF electrode may be designed such that in the closed state it protrudes into a cooking chamber of the cooking container. This PEF electrode may be connected to the PEF generator or earthed. In a variant, the PEF electrode of the cover may be permanently connected to the PEF generator, whilst the connection contact provided in the receptacle is at the reference potential or is connected to the PEF generator.

It is, however, also possible that the PEF electrode integrated in the cover is earthed.

It is a development that the cooking appliance is designed to detect an inserted PEF container. To this end, the cooking appliance may have a (further) monitoring apparatus which detects when a PEF container is correctly inserted. The monitoring apparatus may comprise, for example, at least one electrical contact, which for example may detect an electrical connection of electrical contacts of the PEF container to the associated connection contacts of the receptacle. It is a development that the cooking appliance is designed to activate the associated at least one PEF generator, in particular to supply said PEF generator with power, only when the PEF container is inserted. Thus a particularly high level of operational safety is achieved.

It is an embodiment that the receptacle is connected to a vapor removal apparatus. Thus the advantage is achieved that during a PEF cooking process a smaller quantity of water vapor or vapor is held in the receptacle, so that less water vapor/vapor is condensed therein, and if the receptacle is not sealed in a steam-tight manner relative to the cooktop, water vapor/vapor is also prevented by structurally simple means from being able to spread inside the cooktop.

It is an embodiment that the vapor removal apparatus has at least one fan for blowing air into the receptacle. This air then escapes again from the receptacle and at the same time carries along the steam (water vapor or vapor) therewith.

It is an embodiment that at least one steam outlet opening is present in the cover and/or in a gap between the cover and the top-side edge of the receptacle. The steam (water vapor or vapor) is then blown out of the receptacle through these passage-openings. This embodiment has the advantage that it may be implemented in a particularly space-saving and cost-effective manner, and additionally during the PEF cooking process a user may also visually monitor the cooking process by the steam passing out of the cooktop on the top side. However, alternatively at least one exhaust channel may also open into the receptacle, the steam being able to exit from the receptacle through said exhaust channel.

It is an embodiment that air is able to be initially conducted by means of the fan over an electronics unit for the cooling thereof, and is then able to be blown into the receptacle. The fan which is used for blowing the steam out of the receptacle is thus also an electronic fan. Thus the advantage is achieved that the fan may be used for a plurality of functions and thus a separate ventilation fan is no longer required. This in turn saves installation space and costs.

It is an embodiment that the vapor removal apparatus has at least one fan for suctioning vapor out of the receptacle. As a result, the advantage is achieved that steam in the receptacle may be removed particularly effectively and namely optionally also such that an exit of steam from the top side of the receptacle or, respectively, the cooktop is avoided. As a result, the PEF cooking may be carried out in a particularly inconspicuous manner for a user. For example the steam may be suctioned downwardly in a targeted manner.

It is an embodiment that power electronics of the at least one PEF generator and a cooling fan for cooling the power electronics are arranged in the cooking appliance. Thus the advantage is achieved that it is possible to avoid an overheating of the power electronics. In particular, the power electronics together with the cooling fan may be installed in a housing of the cooktop. Thus a particularly compact design with efficient signal guidance is possible.

It is a development that the cooling fan is provided both for cooling the power electronics of the at least one PEF generator and also to force air into the receptacle.

It is a development that a controller of the PEF cooking apparatus is integrated in a controller of the cooktop, for example via a standardized user control, in particular menu guidance. As a result, the advantage of a consistent operating concept is achieved.

It is a development that a current limiter is arranged in the signal path between the PEF generator and the at least one PEF electrode. This avoids overcurrents in the PEF electrode in a particularly reliable manner and increases operational safety.

The object is also achieved by a system ("PEF system") comprising a cooking appliance as described above and at least one PEF container which is designed to be inserted into a receptacle of the PEF cooking apparatus of the cooking appliance. The PEF system may be configured in a similar manner to the cooking appliance and has the same advantages.

It is an embodiment that the PEF container has at least one mating contact which matches the at least one connection contact of the receptacle and which is electrically connected to at least one PEF electrode of the PEF container from a group of a plurality of PEF electrodes and the PEF electrodes are arranged to the side relative to a cooking chamber of the PEF container for accommodating food to be cooked and opposingly relative to the cooking chamber. The cooking chamber is located, therefore, between at least two opposingly arranged PEF electrodes. The PEF electrodes may be arranged, for example, on the front side and rear side, on the left-hand side and right-hand side and/or top side and bottom side of the cooking chamber. In the case of a top-side arrangement, a PEF electrode may be integrated, for example, in a cover of the PEF container or even in the cover of the receptacle. At least one PEF electrode may also protrude into the cooking chamber.

It is an embodiment that the PEF container has at least two mating contacts which match connection contacts of the receptacle and which are electrically connected to respective PEF electrodes of the PEF container.

It is an embodiment that a PEF electrode is integrated in the cover of the receptacle and the PEF container has a base-side PEF electrode. The PEF electrode integrated in the cover may be connected to the PEF generator, whilst the base-side PEF electrode of the PEF container is earthed or vice versa.

A pulsed electrical signal generated by the PEF generator may be applied to at least one PEF electrode of a pair of opposing PEF electrodes. The other PEF electrode of the pair may also be connected to the PEF generator or, for example, to ground or, respectively, a reference potential. A PEF electrode forms with the electrode (PEF electrode or earthed electrode) opposite thereto, in particular, plates of a capacitor, a PEF field being able to be generated thereby in the cooking chamber and the food to be cooked being positioned therebetween for the PEF cooking.

When inserting the PEF container into the receptacle the connection contacts of the receptacle and the mating contacts of the PEF container are automatically brought into contact with one another. They are also automatically released when the PEF container is removed. The connection contacts of the receptacle and the matching mating contacts of the PEF container may be configured, for example, as plug contacts.

It is a development that the PEF container is a bowl-shaped container.

The PEF container may, in particular, have at least one electrically conductive wall region which serves as a PEF electrode, which increases an effectiveness of the food treatment. In particular, such a wall region may consist of stainless steel which permits a construction with particularly low maintenance and a long service life. The remaining regions of the wall advantageously consist of an electrically insulating material, for example of electrically insulating plastic, in order to insulate the different PEF electrodes relative to one another.

The PEF container may also have at least one handling region which is specifically provided or designed to simplify or to permit the handling of the PEF container. For example, a handling region may be configured as a grip region so as to be gripped by a user, for example as a grip tab, U-shaped handle, etc. A handling region, however, may also be designed for the engagement of a user-guided tool, for example for the releasable fastening of a handle.

If the PEF cooking apparatus is able to receive a plurality of PEF containers at the same time, and the PEF electrodes assigned to the different PEF containers are individually activatable or operatable, this results in the advantage that different treatment sequences or systems (for example comprising different operating settings, time periods, etc.) may be implemented in the individual storage containers. Thus a simultaneous preparation of very different foods is also possible. This in turn simplifies or improves a user-friendliness of the appliance.

It is a development that the PEF cooking apparatus, the PEF container, or both may comprise at least one sensor for sensing at least one property of the food to be cooked. As a result, advantageously a monitoring of the food is possible, which improves the guarantee of success.

The at least one sensor may comprise, for example, at least one temperature sensor for sensing a temperature of the food. To this end, the temperature may be detected directly, or indirectly via a detection of the temperature of the PEF container. A temperature sensor may be a contact sensor, for example a thermocouple, or a contactless measuring sensor, for example a pyrometer, a thermopile, etc.

The at least one sensor may alternatively or additionally comprise at least one conductivity sensor for measuring the electrical conductivity of the food to be cooked or, respectively, the liquid in the PEF container.

It is an embodiment that the drawer comprises at least one sensor for sensing fields, voltages and/or currents in the food which are generated during the PEF treatment. As a result, the operational safety and/or guarantee of success is improved. This may comprise sensing a shape of the voltage pulse and/or the current pulse. A shape may be understood to mean, for example, a height of the pulse, a steepness of the rising and/or falling edges of the pulse and/or a duration of the pulse.

Moreover, the PEF cooking apparatus, the PEF container, or both may have at least one actuator for the non-electrical treatment of the food. Thus the guarantee of success may be further improved. In a development, the at least one actuator comprises a stirrer, the contents of the PEF container being able to be set in motion thereby. Thus a formation of gas bubbles in the PEF container may be advantageously avoided and/or a temperature in the food to be cooked equalized. The stirrer may be, for example, a mechanically driven, for example circulating, stirrer, a driven vibrating stirrer or an ultrasonic stirrer.

The object is also achieved by a method for the PEF treatment of food by means of a cooking appliance and/or system as described above. The method may be configured in a similar manner to the PEF system and/or cooking appliance and has the same advantages.

It is a development that after activating a PEF cooking sequence—for example on the part of a user or program-controlled—it is monitored whether a PEF container is inserted in a receptacle and/or the cover of the receptacle is closed, and if this is the case, the PEF generator is activated or operated for the output of PEF signals.

BRIEF DESCRIPTION OF THE DRAWINGS

The above-described properties, features and advantages of this invention and the manner in which they are achieved will become clearer and more clearly understood in connection with the following schematic description of an exemplary embodiment which is described in more detail in connection with the drawings.

DETAILED DESCRIPTION OF EXEMPLARY EMBODIMENTS OF THE PRESENT INVENTION

Figure 1:
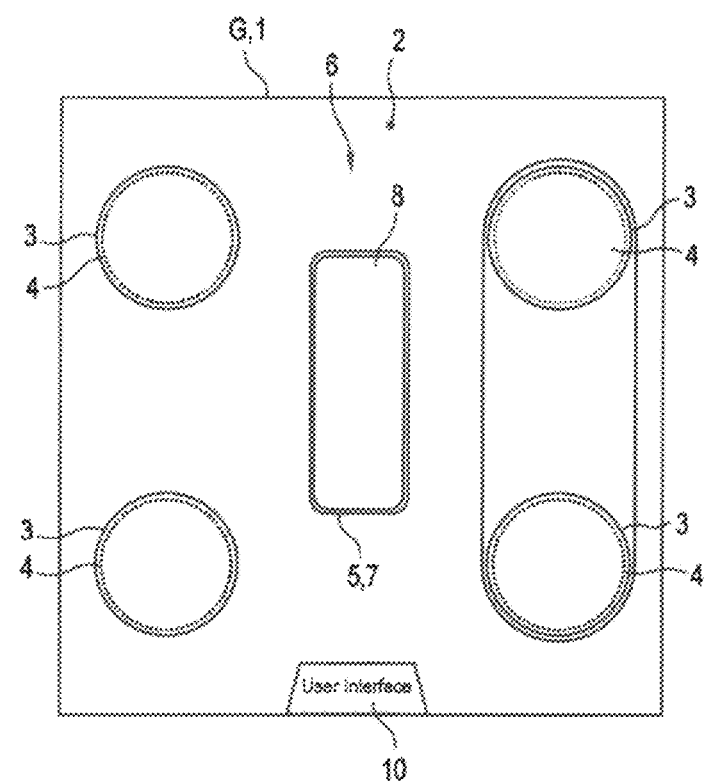
FIG. 1 shows in plan view a sketch of a cooktop with a PEF cooking apparatus integrated therein.

FIG. 1 shows in plan view a sketch of a cooking appliance G with a cooktop 1 with a top-side glass ceramic plate 2 and a plurality (in this case four) cooking zones 3. In each case an energy transmission unit 4 in the form of a radiant heating element or an induction coil is arranged below the cooking zones 3. A receptacle 5 of a PEF cooking apparatus 6 which is accessible on the top side is located approximately centrally between the cooking zones 3. To this end, the glass ceramic plate 2 in the region of the receptacle 5 has a cutout 7 which is able to be covered by means of a cover 8. The cover 8 may be pivotably mounted. If the cover 8 is located in its open position, the receptacle 5 may be loaded with one or more PEF containers 9 (see FIG. 2) through the cutout 7. A user interface 10 may be located on a front edge or front-side edge of the cooktop 1.

Figure 2:
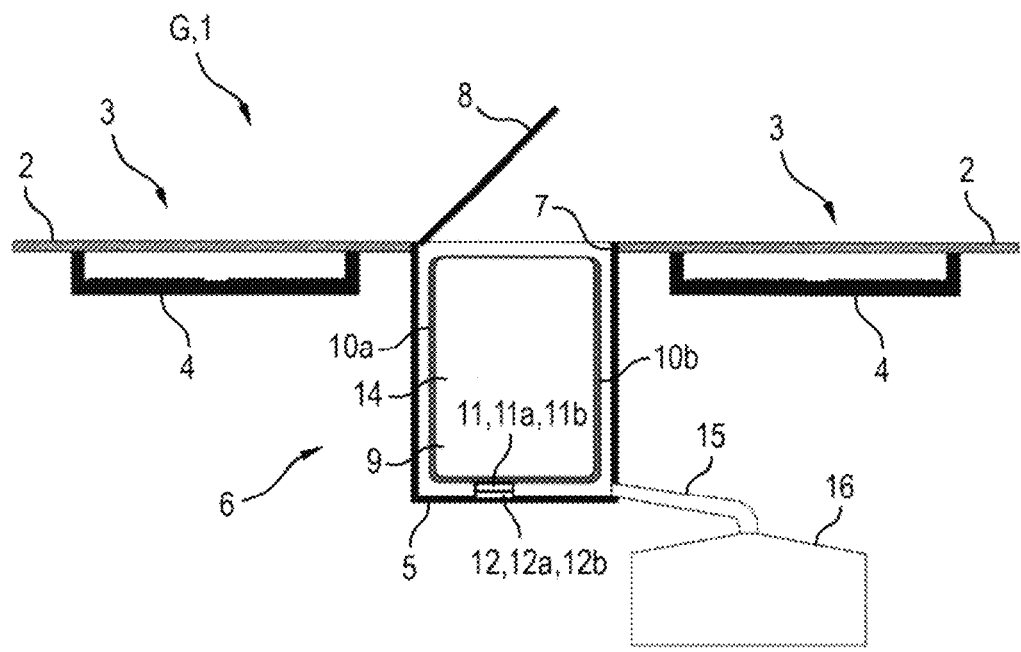
FIG. 2 shows the cooktop with a PEF cooking apparatus as a sectional view in front view.

FIG. 2 shows the cooking appliance G as a sectional view in front view with a PEF container 9 inserted from above through the cutout 7 into the receptacle 5 with the cover 8 partially open. The PEF container 9 is configured as a bowl-shaped container which is open on the top side. For example, two side wall regions of the PEF container 9 may be configured as opposing electrically insulated PEF electrodes 10a, 10b. The PEF electrodes 10a, 10b are connected to respective contacts ("mating contacts") 11a, 11b of a plug connection element ("mating plug connection element") 11. When the PEF container 9 is inserted, the mating plug connection element 11 is inserted into a plug connection element 12 of the receptacle 5, so that the mating contacts 11a, 11b are electrically in contact with respective contacts ("connection contacts") 12a, 12b of the plug connection element 12. Of the connection contacts 12a, 12b, one connection contact 12a is electrically connected to a signal output of a PEF generator 13 (see FIG. 3) of the PEF cooking apparatus 6, whilst the other connection contact 12b is grounded or, respectively, is at a reference potential. Alternatively, the plug connection element 12 and the mating plug connection element 11 may also have just one connection contact 12a or, respectively, one mating contact 11a.

The free space provided by the PEF container 9 between the PEF electrodes 10a, 10b forms a cooking chamber 14 which is able to be loaded with food to be cooked S (see FIG. 4) by a user.

A drain 15 or drainage channel, which leads downwardly to a collection container 16, opens into a region of a base of the receptacle 5. Liquid overflowing from a PEF container 9 and water vapor and/or vapor condensed in the receptacle 5 flows through the drain 15 into the collection container 16 which, in particular, may be removed by a user for emptying and/or cleaning.

Figure 3:
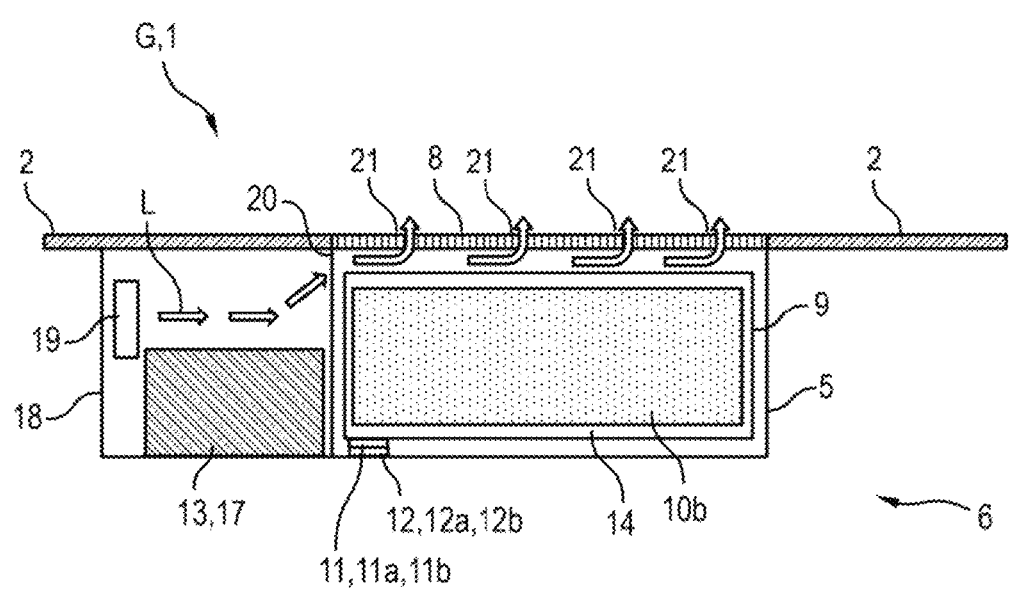
FIG. 3 shows the cooktop with a PEF cooking apparatus as a sectional view in side view.

FIG. 3 shows the cooking appliance G as a sectional view in side view. A space for accommodating at least one power electronics 17 of the PEF generator 13 ("generator space" 18) is located adjacent to the receptacle 5. Additionally the cooking appliance G has a fan 19 for cooling the power electronics 17, said fan also being accommodated here in the generator space 18. The generator space 18 is open relative to the receptacle 5 in terms of gas technology (for example by providing air passage openings in a partition wall 20 between the generator space 18 and the receptacle 5). During the operation of the fan 19 cool air L is initially conducted over the power electronics 17 and then blown into the receptacle 5. As a result, the cool air may exit, for example, upwardly through steam outlet openings 21 present in the cover 8 or at a gap between the cover 8 and the top-side edge of the receptacle 5 or, respectively, the glass ceramic plate 2, as indicated by the arrows. Water vapor and/or vapor is carried along with the exit of the cool air, so that the water vapor and/or vapor is not able to spread in the cooking appliance G.

Figure 4:
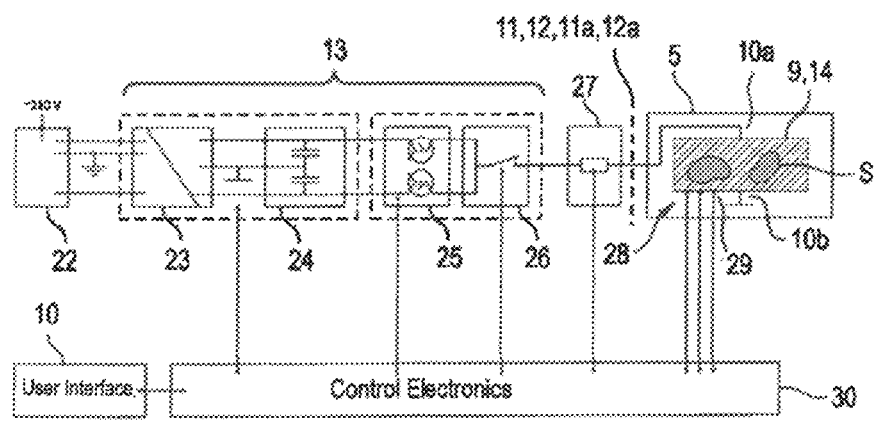
FIG. 4 shows a possible equivalent circuit diagram of a circuit for the PEF treatment of food to be cooked by means of a PEF cooking apparatus integrated in a cooktop.

FIG. 4 shows a simplified equivalent circuit diagram of a circuit for the PEF treatment of food to be cooked S by means of the PEF generator 13. The circuit has a power supply unit 22 for the PEF generator 13 which may have an interference filter. The PEF generator 13 has a voltage generator 23 which is connected on the output side to a capacitor bank 24. The capacitor bank 24 serves to keep the voltage output by the voltage generator 23 stable. The capacitor bank 24 is connected on the output side to a pulse generator 25 for generating a steep-edged voltage pulse. The pulse generator 25 is connected in turn on the output side via an electrically switchable switch 26 and a current sensor and limiter 27 to the connection contact 12a of the receptacle 5. When the PEF container 9 is inserted, for example, the PEF electrode 10a is also connected via the mating contact 11a to the PEF generator 13. The other PEF electrode 10b which, as in the case of the PEF electrode 10a, serves as a capacitor plate of a capacitor, between which the food to be cooked S may be introduced, is grounded.

A plurality of sensors 28 may be present on the receptacle 5, by means of which for example a temperature and/or an electrical conductivity in the PEF container 9, a shape of the voltage pulse and/or current pulse at the site of the food to be cooked S, etc. are able to be detected thereby. One of these sensors 28 is a contact switch 29 which serves for monitoring the cover 8 relative to its closed state.

The circuit also comprises control electronics 30 for controlling the circuit, for example for evaluating the measurement signals of the current sensor 27, in particular on the basis of an evaluation of the measurement signals of the current sensor 27, for activating (for example, switching on and off, for pulse shaping, etc.) and monitoring (for example the output voltages) of the PEF generator 13 and optionally for activating the user interface 10 of the cooking appliance 1. In particular, the control electronics 30 may be designed to operate the PEF generator 13, in particular to supply said PEF generator with current only when it has been identified via the contact switch 29 that the cover 8 is in its closed state.

Naturally the present invention is not limited to the exemplary embodiment shown.

Generally "a" "an", etc. may be understood to mean a singular or a plural, in particular in the sense of "at least one" or "one or more", etc. provided this is not explicitly excluded, for example by the expression "exactly one", etc.

Numerical data may also encompass precisely the specified number and a conventional tolerance range, provided this is not explicitly excluded.

The invention claimed is:

1. A cooking appliance, comprising:
 a cooktop including a glass ceramic plate, a plurality of cooking zones, and an energy transmission unit arranged below the cooking zones for transmitting energy in order to heat a place-on appliance placed on the cooktop; and
 a PEF ("Pulsed Electric Fields") cooking apparatus including
  a receptacle accessible from a top side of the glass ceramic plate of the cooktop and designed for insertion of a PEF container, said receptacle comprising a connection contact for electrically connecting to the PEF container inserted in the receptacle, and
  a PEF generator, which is being connected to said connection contact.

2. The cooking appliance of claim 1, further comprising a plurality of said connection contact connected to the PEF generator.

3. The cooking appliance of claim 2, wherein the plurality of connection contacts are connected to different signal outputs of the PEF generator.

4. The cooking appliance of claim 2, wherein at least one of the plurality of connection contacts is grounded.

5. The cooking appliance of claim 1, further comprising a cover designed to cover the receptacle on a top side, said cooking appliance being designed to detect a closed state of the cover and to activate the PEF generator only when the cover is closed.

6. The cooking appliance claim 1, wherein the PEF generator includes a power electronics, and further comprising a cooling fan for cooling the power electronics.

7. The cooking appliance of claim 1, further comprising a collection container and a drain which connects the receptacle to the collection container.

8. The cooking appliance of claim 1, further comprising a vapor removal apparatus, said receptacle being connected to the vapor removal apparatus.

9. The cooking appliance of claim 8, wherein the vapor removal apparatus includes a fan for blowing air into the receptacle.

10. The cooking appliance of claim 9, further comprising an electronics unit, said fan being designed to blow air over the electronics unit and then into the receptacle.

11. The cooking appliance of claim 8, further comprising a cover designed to cover the receptacle on a top side and including a steam outlet opening for vapor to exit.

12. The cooking appliance of claim 8, further comprising a cover designed to cover the receptacle on a top side such as to define a gap between the cover and a top-side edge of the receptacle for vapor to exit.

13. The cooking appliance of claim 8, wherein the vapor removal apparatus includes a fan for suctioning vapor out of the receptacle.

14. A PEF system, comprising:
a cooking appliance comprising a cooktop which includes a glass ceramic plate, a plurality of cooking zones, and an energy transmission unit arranged below the cooking zones for transmitting energy in order to heat a place-on appliance placed on the cooktop, and
a PEF ("Pulsed Electric Fields") cooking apparatus which includes
a receptacle accessible from a top side of the glass ceramic plate of the cooktop and designed for insertion of a PEF container, said receptacle comprising a connection contact for electrically connecting to the PEF container inserted in the receptacle;
the PEF container designed to be inserted into the receptacle of the PEF cooking apparatus of the cooking appliance and including a cooking chamber for accommodating food to be cooked PEF electrodes, said PEF container having a mating contact which matches the connection contact of the receptacle and is electrically connected to a respective one of the PEF electrodes of the PEF container, said PEF electrodes being arranged to a side of the cooking chamber of the PEF container; and
a PEF generator, which is being connected to said connection contact.

15. The PEF system of claim 14, wherein the respective one of the PEF electrodes of the PEF container is arranged opposingly relative to the cooking chamber of the PEF container.

* * * * *